March 20, 1945.  R. I. BRADLEY  2,371,603
TEMPERATURE MEASURING INSTRUMENT
Original Filed July 1, 1941
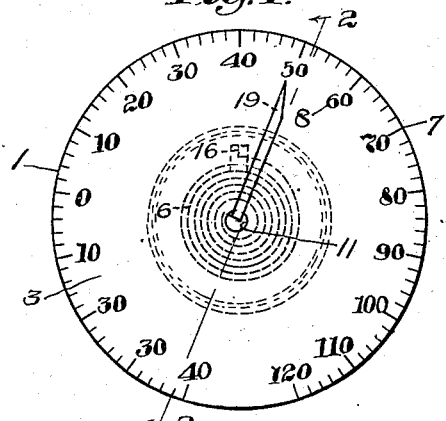
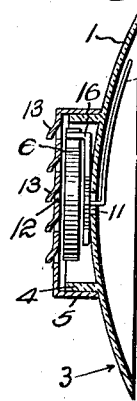 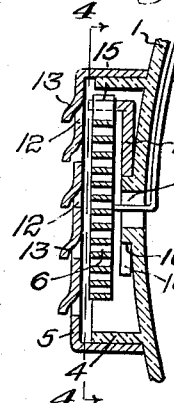 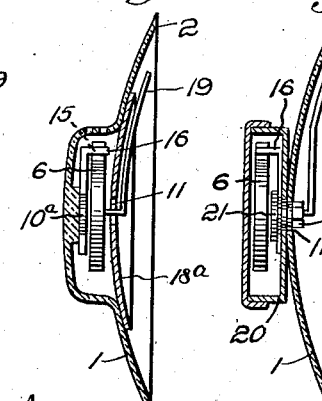 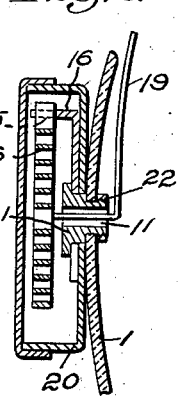
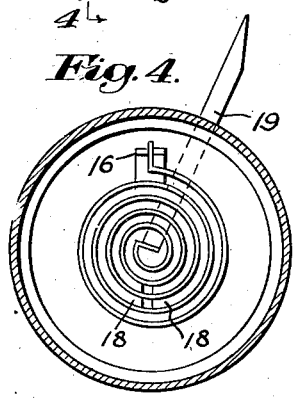 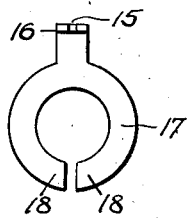
Inventor:
Robert I. Bradley
Attys.

Patented Mar. 20, 1945

2,371,603

UNITED STATES PATENT OFFICE 2,371,603

TEMPERATURE MEASURING INSTRUMENT

Robert I. Bradley, Belmont, Mass.

Original application July 1, 1941, Serial No. 400,676. Divided and this application July 2, 1942, Serial No. 449,413

8 Claims. (Cl. 73—367)

This application is a division of my application which resulted in Patent No. 2,318,459, dated May 4, 1943, and is directed to a different form of construction of a temperature measuring instrument from that claimed in said patent, and having certain advantages thereover and novel features distinguishing it therefrom.

In the drawing:

Fig. 1 is a front elevation of a preferred form of the instrument embodying the present invention;

Fig. 2 is a section on the line 2—2 of Fig. 1;

Fig. 3 a similar section, partly broken away, and on an enlarged scale;

Fig. 4 is a vertical section on the line 4—4 of Fig. 3 showing the temperature-responsive element and the casing which houses it;

Fig. 5 is a section in a plane similar to Fig. 2, illustrating a modified construction;

Fig. 6 is a similar view showing another modification;

Fig. 7 a similar, fragmentary sectional view of the same construction as in Fig. 6, on an enlarged scale, with the coil and its mount in section; and Fig. 8 is a rear elevation of the coil supporting element shown in Fig. 2.

As here illustrated the instrument comprises a shallow saucer-like concavo-convex circular base portion 1 which may be of glass, plastic or other appropriate material, preferably transparent or translucent. The outer edge 2 of this base is designed to engage a flat surface, for instance the outer side of a window pane (not shown) and is preferably flat to facilitate the attachment of the base to the support, for example by cement.

In accordance with the present invention, the temperature-responsive unit is arranged at the outer, rear, or convex side 3 of the base and is protected by an enclosing housing. This housing, as illustrated in Figs. 2 and 3, comprises a substantially cylindrical annular flange 4 coaxial with the base 1 and integrally joined to the latter (although it may be a separate element if desired) and a removable cap or cover 5 of any suitable material, for instance glass, plastic or metal and which, as illustrated, comprises a cylindrical side wall which telescopes snugly over the flange 4. The flange 4, in cooperation with this removable cap 5, provides a chamber within which the temperature-responsive unit is housed and protected from mechanical injury; preferably the outer or rear wall of the cap 5 is furnished with slots 12 and louvers 13 so that the temperature-responsive element may be fully exposed to the temperature of the air at the outer or rear side of the instrument.

The base 1 is provided with a circular scale coaxial with the base and including spaced graduations 7 and designating numerals 8, and, if the base is of transparent or translucent material, these graduations and the location of the pointer relative thereto may be observed from the concave, front or inner side, or from the convex, rear, or outer side of the instrument.

In the arrangement illustrated in Figs. 2 and 3 the temperature-responsive element 6 is mounted upon a support carried directly by the base 1. For this purpose the base 1 is provided with a post or stud 10, preferably of the same material as the base and as here shown integral with the base, this post or stud being in the nature of an annular, rearwardly directed cylindrical flange concentric with an aperture 11 at the center of the base, said aperture being designed for the passage of the pointer staff as hereafter described.

The temperature-responsive unit 6 is a bimetallic flat spiral coil having its outer end fixed in a slot 15 in a rearwardly directed ear 16 (Figs. 4 and 8) at the outer end of a radial arm carried by a split resilient clamping or gripping ring 17. This ring 17, preferably of metal, is of such an internal diameter as frictionally to grip the outer peripheral surface of the post or stud 10 so as normally to remain in adjusted position, although it is capable of being turned angularly about the axis of the stud 10 if sufficient force be applied, thereby to permit calibration of the instrument.

The inner end portion of the coil is bent at substantially right angles to the plane of the spiral coil to form a staff or shaft portion which extends freely through the annular stud 10 and through the aperture 11 in the base, the staff being coaxial with the base. At the inner or concave side of the base there is arranged a pointer 19 for cooperation with the scale 7. As here illustrated this pointer is integrally joined to the inner end of the staff, making an angle of approximately 90° with the staff at the point of junction. This integral connection of the pointer to the bi-metallic coil provides great accuracy of operation, since there is no possibility of lost motion between the pointer and the movable inner end of the coil. As illustrated in Figs. 2 and 3, the pointer 19 is curved substantially concentrically with the concavity of the base 1, and the staff which carries the pointer 19 is of such a length that the pointer is spaced slightly from the front, inner, or concave surface of the base so as not to contact the base as it swings along the scale.

In Fig. 5, the coil chamber is defined by a forwardly directed integral portion of the base proper and the ring 17 with the coil unit 6 is carried by a boss 10a on the rear or outer wall of the coil housing chamber. The chamber may have an inner wall 18a if desired.

As illustrated in Fig. 6, the coil is housed in a shallow box 20 having a cylindrical side wall and a flat front wall, the latter being provided with a central aperture. This box is secured to the base by means of a hollow stud or post 21 which passes through the central aperture 11 of the base. A nut 22 engages screw threads on the forward or inner end of the stud 21, and thus clamps the box firmly against the rear or convex side of the base. A coil supporting ring 17, like that of Fig. 8, embraces the rear end of the stud 21, and the pointer staff passes through the bore in the stud 21 and through the nut 22.

The temperature responsive coil unit mounted at its outer end as shown and described, and with its inner end fashioned into a pointer, has several advantages; for one, it is a much simplified form. In this construction it will be noted there need be no bearing for the swinging arm or pointer, which is an advantage, eliminating possible frictional and corrosion trouble with the necessity of oiling, which is usually necessary in delicately constructed instruments of any kind, for the purpose of obtaining accurate results.

The obvious advantages of this type of instrument are that it is compact, of simple and reliable design, inexpensive to manufacture, and, because of its construction, may be manufactured so that it may be mounted in spaces impractical for any other type of instrument, because it may be made "wafer" thin, as it has been described.

The use of a temperature responsive coil so fashioned that it also becomes the complete working mechanism, including the pointer, allows for economical manufacture, and also because of the elimination of accessory parts, errors from friction, weight, etc., are eliminated.

An outstanding advantage also is the fact that after a period of time there is no effect from corrosion on working parts, as is the case when bearings and levers are used.

This instrument is practical for mountings, such as might be required, or attractive for indoor desk, table, or wall thermometers. It is also highly desirable for use on or near windows to record outside temperature, and may be used on the inside or outside of automobiles, airplanes, or other vehicles similarly.

In the outdoor models, although the bi-metallic coil is partially insulated from the window by its housing, it may in some instances, still be affected by heat loss or cold leakage through the window. This, of course, is true of any outside thermometer mounted close to a building. However, the bi-metallic coil in this thermometer is preferably made slightly over-active or sensitive to compensate for average heat loss, by making the coil longer than usual, and it being cumulative with increased temperature change, it is possible and practical to offset the higher percentage of heat loss or cold leakage if the building is air conditioned, as the differential between outside and inside temperature increases. Therefore, elimination of frictional and weight interferences, together with compensation to offset for house radiation, allows for the manufacture of an instrument for outdoor mounting that will give more accurate temperature readings than is otherwise possible with any other type of instrument.

The foregoing device embodies simplicity of design, economy in construction, and sensitiveness and accuracy in operation.

My invention is not limited to the precise construction shown herein, but may be modified in many details, without departing from the spirit of the claims, and within the scope thereof.

I claim:

1. A thermometer having a case including a hollow concavo-convex base portion providing a shallow chamber for the reception of a pointer, the edge of the base portion being flat and designed to engage a flat supporting surface, the base having a central aperture, a pointer curved substantially to conform to the curvature of the concave side of the base, the pointer having an integral staff portion extending axially through the aperture in the base to the convex side of the latter, a bimetallic coil having its inner end integral with said staff, the coil being disposed at the convex side of the base, means normally holding the outer end of the coil in fixed position, and means providing a housing for the coil.

2. A thermometer having a case including a hollow concavo-convex base portion providing a shallow chamber for the reception of a pointer, the edge of the base portion being flat and designed directly to engage a flat supporting surface, the base having a central aperture, a normally fixed annulus coaxial with said opening in the base and disposed at the convex side of the base, a bimetallic coil disposed at the convex side of the base, a split collar frictionally embracing the annulus and having a substantially radial arm, means uniting the outer end of the coil to the outer end portion of said arm, the inner end portion of the coil being shaped to form a pointer staff and extending axially through the opening in the base to the concave side of the latter, the staff having an integral portion which constitutes a pointer, the pointer being disposed at the concave side of the base, and the base having graduations cooperable with the pointer to indicate temperature variations.

3. A thermometer having a case including a unitary hollow concavo-convex base portion having a central aperture and a substantially plain forward edge designed for contact with a support, housing means at the convex side of the base defining a chamber for the reception of a thermally responsive element, a fixed annular stud within said chamber and carried by the base, a normally stationary split collar embracing the stud, the collar being manually rotatable relatively to the stud and having a substantially radial arm, a bimetallic coil having its outer end fixed to said arm and having its inner end portion arranged axially of the coil to form an index staff which extends through the aperture in the base, an index arm integral with said staff and which makes an angle of approximately 90° with the staff at its point of junction with the latter, the free outer portion of said arm being curved concentrically with the concave surface of the base, the index staff being of such length that the index arm is spaced a slight distance from the inner concave surface of the base.

4. A thermometer as set forth in claim 3 further characterized in that the housing means comprises an annular cylindrical rearwardly directed flange integral with the base and concentric with the annular stud, and a removable cover comprising a forwardly directed rim having frictional engagement with said flange.

5. A thermometer as set forth in claim 1 further characterized in that the housing means comprises a rearwardly directed hollow boss having substantially cylindrical side walls integral with the base and whose rear wall is integral with its side walls, the means which normally holds the outer end of the coil in fixed position comprising a stud which projects forwardly from the rear wall of the hollow boss.

6. A thermometer as set forth in claim 1 further characterized in that the housing means comprises a substantially cylindrical box including a side wall and a front wall, the front wall having a central aperture and an annular stud passing through said aperture and through a corresponding aperture in the base, the stud having a fixed head at its rear end and screw threads at its forward end engaged by a nut which bears against the inner concave surface of the base, thereby clamping the box to the base, and a cover for the box having a rim which frictionally engages the wall of the box.

7. A thermometer as set forth in claim 1 further characterized in that the base is circular and of spherical curvature.

8. A thermometer as set forth in claim 1 further characterized in that the base is transparent and in having the graduations so arranged as to be readable from the convex side of the base.

ROBERT I. BRADLEY.